Oct. 10, 1967
JAMES E. WEBB
ADMINISTRATOR OF THE NATIONAL
AERONAUTICS AND SPACE
ADMINISTRATION
TUBE DIMPLING TOOL
3,345,840
Filed Dec. 27, 1966
2 Sheets-Sheet 1
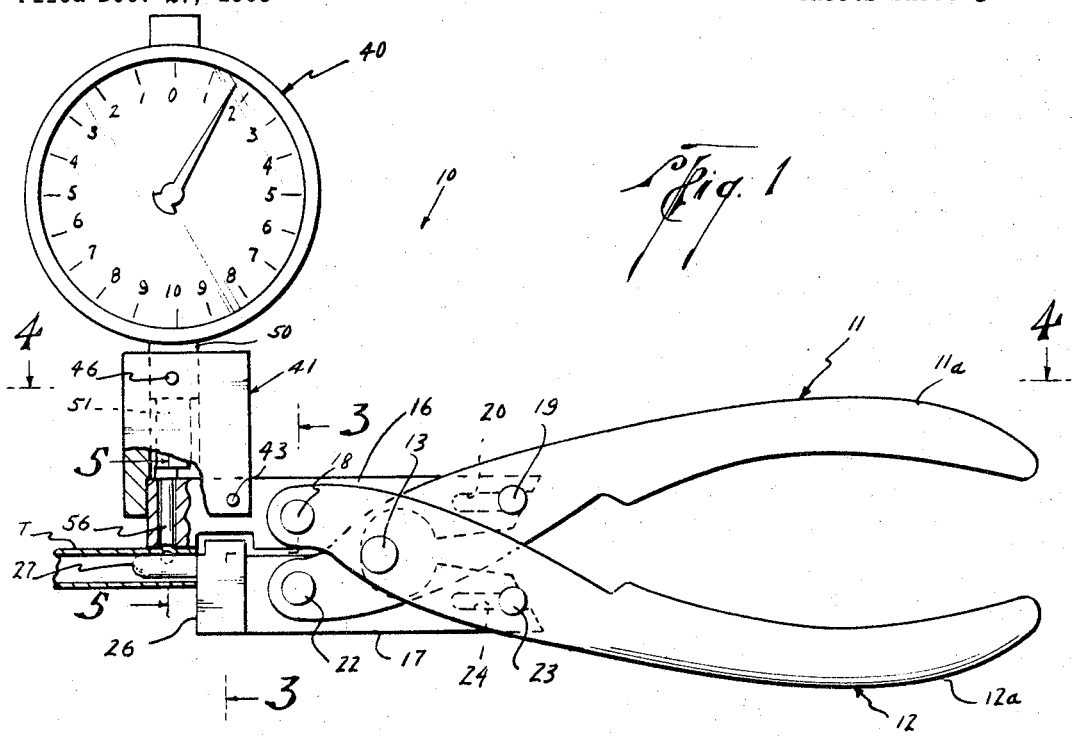
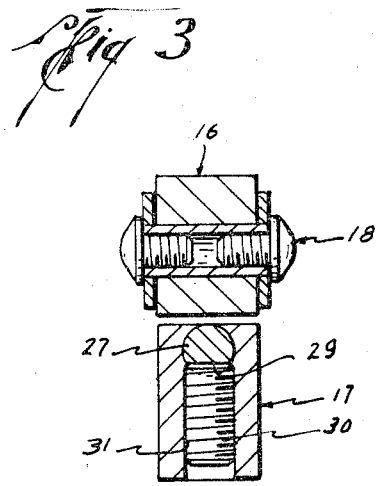
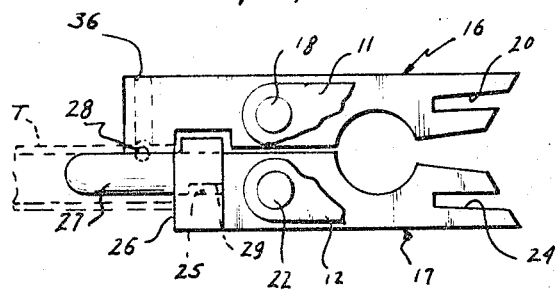
Charles S. Bevyukian
Robert M. Heisman
INVENTORS
BY
ATTORNEYS Oct. 10, 1967
JAMES E. WEBB
ADMINISTRATOR OF THE NATIONAL
AERONAUTICS AND SPACE
ADMINISTRATION
TUBE DIMPLING TOOL
3,345,840
Filed Dec. 27, 1966
2 Sheets-Sheet 2
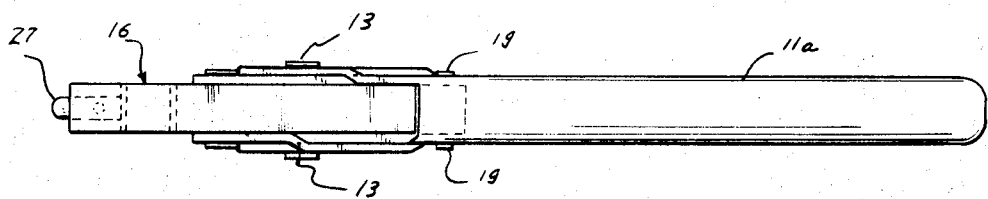
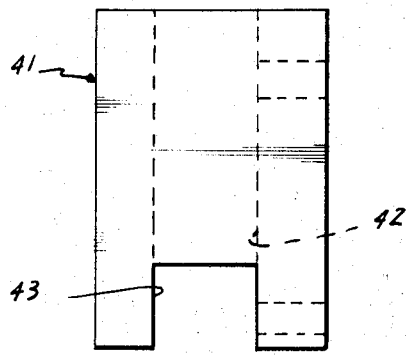
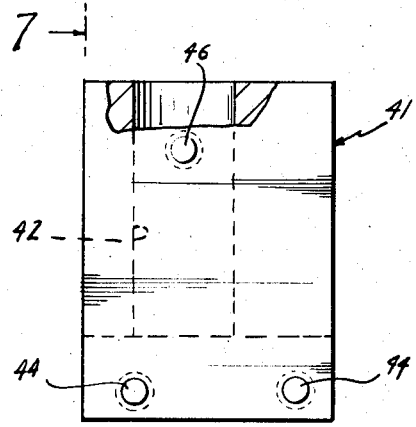
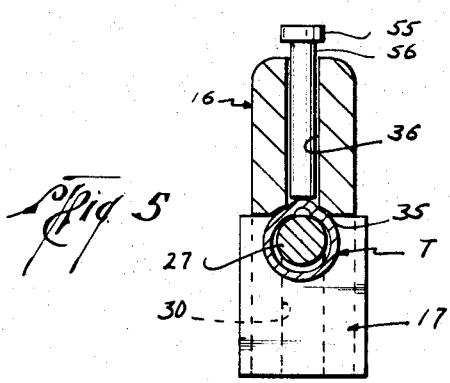
Charles S. Bevyukian
Robert M. Heisman
INVENTORS
BY
ATTORNEYS

United States Patent Office 3,345,840
Patented Oct. 10, 1967

3,345,840
TUBE DIMPLING TOOL
James E. Webb, Administrator of the National Aeronautics and Space Administration, with respect to an invention of Charles S. Beuyukian, Gardena, and Robert M. Heisman, Palos Verdes, Peninsula, Calif.
Filed Dec. 27, 1966, Ser. No. 605,100
6 Claims. (Cl. 72—34)

The invention described herein was made in the performance of work under a NASA contract and is subject to the provision of Section 305 of the National Aeronautics and Space Act of 1958, Public Law 85–568 (72 Stat. 435); U.S.C. 2457.

This invention relates to a hand tool, and more particularly to a tool for forming dimples and nipples on the end portion of a tube.

When tubes of different diameters are brazed together in a series-flow relationship, the tube of smaller diameter is not always centered with respect to the larger tube which is sleeved thereover, and the resulting mismatch at the brazed joint adversely affects the braze quality. Heretofore there have been known commercially available tools for satisfactorily centering tubes for the purpose noted above and centering of a tube in concentric relation to a fitting structure has usually been accomplished by visual inspection. With the tool of this invention nipples can be formed on the end portion of the smaller tube, each of which corresponds in height to the difference between the outer diameter of the smaller tube and the inner diameter of the larger tube which is to be fitted thereover. Consequently, the nipples serve as accurate spacer means for precisely centering the smaller tube preparatory to brazing.

Although there are tools currently available which can be used for forming nipples and dimples in tubular members, these are usually complex devices comprising opposed die members which are movable by wedge or screw means. No tools are known which can be easily held in the hand to perform very precise dimpling and nipple forming and at the same time provide means for controlling and accurately measuring the height of a nipple so formed.

The tool of this invention which has been devised to overcome the attendant disadvantages of the prior art devices and methods is a plier-like device which may be held in one hand while accomplishing a precise tube dimpling and nipple forming operation. The device comprises a pair of conventional pivotally connected lever arms which provide opposed handles on one side of the pivot axis and on the other side of the pivot are operatively connected to a pair of jaw members which are adapted for relative opening and closing movement in correspondence with movement of the handle. The jaw members are mounted on the lever arms in a manner so as to move only in parallel motion relative to one another.

The tool is also provided with a mandrel which is carried by one of the jaw members and is adapted to receive a tube in sleeved relationship thereon. A projection is provided in the surface of the mandrel and the second jaw member is formed with a clamping surface and a bore therethrough in registry with the mandrel and the mandrel projection, respectively. When a tube is sleeved over the mandrel and the mandrel projection, gripping the handles of the device effects a closing movement of the jaw members which compresses the tube against the clamping surface and forms a dimple in the inner surface of the tube and a corresponding nipple on the outer surface.

The tool of this invention also includes a contact pin which extends through the bore in the second jaw member and contacts the surface of the tube which is to be deformed opposite the mandrel projection. The contact pin is operatively connected to a displacement measuring dial gauge of conventional type whereby, as a nipple is formed on the tube by closing movement of the jaw members, the gauge is driven by the contact pin and provides an accurate indication of the height of the nipple.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 1 is a view of the dimpling and nipple forming tool of this invention, partly in section, showing the tool in the operative condition of forming a nipple on the end of a tube;

FIG. 2 is a view showing the relationship of the jaw members of the tool in FIG. 1 and the mandrel carried by one of the jaw members;

FIG. 3 is a sectional view through the device of FIG. 1 as taken along the broken line 3—3 and looking in the direction of the arrows:

FIG. 4 is a top view of the tool of FIG. 1 with the indicator gauge and gauge mounting means removed therefrom;

FIG. 5 is a cross sectional view through the device in FIG. 2 as taken along the broken line 5—5 and looking in the direction of the arrows; and FIGS. 6 and 7 are front and side views, respectively, of the mounting means for supporting the indicator gauge on the upper jaw member.

Referring more particularly to FIGS. 1 and 4 of the drawings, the tool 10 of this invention comprises a pair of lever arms 11 and 12 which are pivotally connected intermediate their ends by a pivot pin 13 in a manner to provide opposed handles 11a and 12a, respectively. For approximately half of their length each of the lever arms has a bifurcated portion, which portions receive upper and lower jaw members 16 and 17, respectively. The upper jaw member 16 is pivotally connected to one end of the lever arm 12 by a pivot 18. It is also slidably and pivotally connected to the handle portion of the lever arm 11 by means of a pivot pin 19 which extends transversely across the bifurcated section of the lever arm 11 and is received in an elongate slot 20 which extends inwardly from the end of the jaw member. The lower jaw member 17 is similarly connected to the lever arms by a pivotal connection 22 with lever arm 11 and a pivotal sliding connection with the handle portion of lever arm 12 by means of the pivot pin 23 which seats within a slot 24 in the end of the jaw member 17. By this manner of connection, opening and closing movement of the jaw members results in relative parallel motion of the jaw members upon corresponding opening and closing movement of the handles 11a and 12a.

The lower jaw member 17 is provided with a bore 25 which extends inwardly from one end 26 of the jaw 17 and is adapted to receive a cylindrical mandrel 27 therein. The upper surface of the mandrel 27 is provided with a projection 28 in the form of a hard chrome steel ball which is seated and press fitted in a conforming semispherical depression provided in the mandrel. As best shown in FIGS. 2 and 3, the mandrel 27 is also formed with a flat surface 29 at the end thereof which is inserted into the bore 25. The surface 29 provides a seat for the end of a set screw 30 which is threaded through a bore 31 extending upwardly from the lower surface of the jaw member. The set screw secures the mandrel to the jaw 17 in a position with the projection 28 facing the upper jaw member 16.

As best shown in FIG. 4, the upper jaw member, which is of greater length than the lower jaw, is formed with a concave lower surface 35 in the end portion thereof which overlies the mandrel 27. It is also provided with a vertical bore 36 which extends therethrough in registry with the spherical projection on the mandrel 27.

For performing a dimple and nipple forming operation, the tube T which is to be deformed is sleeved over the mandrel 27 until the end of the tube abuts the end 26 of the lower jaw member 17. It will therefore be apparent that by gripping the handles of the tool 10 and compressing the same, the upper and lower jaws 16 and 17 are moved towards one another in a parallel motion until the mandrel 27 has forced the tube against the clamping surface of the upper jaw member. By slightly increasing the pressure on the handles, the projection 30 of the mandrel forces an indentation or dimple on the inner surface of the tube T and a corresponding nipple on the outer surface thereof which protrudes upwardly into the bore 36 in the upper jaw member. The parallel movement of the jaws provides for accuracy in forming dimples and uniformity in forming a plurality of nipples to the same specification.

However, to provide a means for controlling the height of a nipple formed on the tube T and to permit the use of the same mandrel 27 for deforming tubes with other nipple heights, the tool 10 is provided with a displacement measuring dial gauge 40 of conventional type which is carried on the upper jaw 16 by a generally rectangular shaped mounting member 41. The mounting member 41 is a generally rectangular block formed with a vertical bore 42 which extends through the block and a channel 43 in the lower end of the block which seats over the jaw member 16. The block 41 is fastened to the upper jaw member by set screws 43 which are threaded on holes 44 formed in the block 41.

The displacement measuring gauge 40 is provided with a protruding cylinder 50 which is sleeved over a plunger 51 and is inserted into the bore 42 of the mount 41. The cylinder 50 is locked therein by means of a set screw 46 to thereby secure the displacement measuring gauge to the jaw 16. The end of the plunger 51, which is operatively associated with the dial of the gauge, contacts the upper end 55 of a contact pin 56 which is inserted into the bore 36 of the upper jaw member 16. The lower end of the contact pin engages the outer surface of the tube T when it is sleeved over the mandrel 27.

It will therefore be noted that when the handles of the tool 10 are gripped with sufficient force to move the tube T against the concave clamping surface of the upper jaw 16, the contact pin is forced to rise, thereby producing a displacement measurement indication on the dial of the gauge 40. The dial indicator gauge is then adjusted to zero and pressure on the tool handles is increased so that the deforming projection 28 of the mandrel dimples the inner surface of the tube and correspondingly forms a nipple in the outer surface thereof. As this occurs, the contact pin 56 is moved upwardly in axial movement by a distance corresponding to the height of the nipple which has been formed. The movement of the contact pin forces the plunger of the dial gauge upwardly, which translates the plunger movement to rotary movement of the dial indicating pointer, whereby an accurate reading of the height of the dimple can be readily determined.

It will therefore be apparent that an extremely accurate nipple height can be obtained by the use of the tool of this invention. The tool may be used to form any number of deformations around the end of a tube which, when properly spaced, permit accurate center alignment of the tube in an aperture of a fitting member for brazing procedures. As a result, more accurate and economical assembly of brazed joints is made possible with an improvement of braze quality.

Although the tool 10 has been described with regard to an application for dimpling and nipple forming the end of a tube, it could as readily be used to similarly deform other members such as metal plates, and the like.

It should also be understood that the foregoing disclosure relates only to a preferred embodiment of the invention and that it is intended to cover all changes and modifications of the examples in the invention herein chosen for the purposes of the disclosure and which do not constitute departure from the spirit and scope of the invention.

What is claimed and desired to be secured by Letters Patent is:

1. In a tool of the type having first and second lever arms which are pivotally connected intermediate their ends to provide opposed handles on one side of the pivot axis and are operatively connected to first and second jaw members, respectively, for relative opening and closing movement of the jaw members on corresponding movement of the handles, the combination comprising:

a mandrel carried by said first jaw member;

nipple forming means in the nature of a projection on the surface of said mandrel, said second jaw member having a clamping surface in registry with said mandrel and said projection, whereby a tube sleeved over said mandrel is adapted to be clamped and compressed between said mandrel and said clamping surface by closing pivotal movement of said handles and jaw members to thereby form a dimple on the inner surface of said tube and a corresponding nipple on the outer surface of said tube by said nipple forming means; and gauge means carried on said second jaw member for measuring and indicating the height of a nipple formed on said tube by said nipple forming means.

2. A tool as described in claim 1 wherein said gauge means comprises an elongate contact pin mounted for axial movement on said second jaw member, said contact pin having one end thereof adapted to engage the outer surface of a tube when in sleeved position over the mandrel, whereby the forming of a nipple on said tube by said nipple forming means produces axial movement of said contact pin corresponding to the height of the nipple, and dial indicating means responsive to axial movement of the contact pin for indicating the height of the nipple.

3. A tool comprising first and second lever arms pivoted intermediate their ends to provide opposed handles on one side of the pivot axis;

first and second jaw members operatively connected to said lever arms for relative opening and closing parallel movement in correspondence with movement of said handles, said first jaw member being slidably and pivotally connected to the handle of said first lever arm and pivotally connected to said second lever arm on the other side of said pivot axis, said second jaw member being slidably and pivotally connected to the handle of said second lever arm and pivotally connected to said first lever arm on the other side of said pivot axis;

a mandrel carried by said first jaw member;

deforming means in the nature of a projection on the surface of said mandrel, said second jaw member having a clamping surface in registry with said mandrel whereby a tube sleeved over said mandrel is adapted to be clamped and compressed between said mandrel and said clamping surface by closing parallel movement of said jaw members to thereby form a dimple on the inner surface of said tube and a corresponding nipple on the outer surface of said tube by said deforming means; and gauge means carried on said second jaw member for measuring and indicating the height of a nipple formed on said tube by said deforming means.

4. A tool as described in claim 3 wherein said gauge means comprises:

an elongate contact pin which extends through a bore provided in said second jaw member and is mounted on said second jaw member for axial movement thereon with one end of the contact pin adapted to engage the outer surface of a tube when in sleeved position over said mandrel, whereby the forming of a nipple on said tube by compression of the tube against said projection produces axial movement of the contact pin corresponding to the height of the nipple, and dial indicating means responsive to axial movement of said contact pin for indicating the height of a nipple formed on said tube by said deforming means.

5. In a tool of the type having first and second lever arms which are pivotally connected intermediate their ends to provide opposed handles on one side of the pivot axis and are operatively connected to first and second jaw members, respectively, for relative opening and closing movement of the jaw members on corresponding movement of the handles, the combination comprising:

projection means on said first jaw member, said second jaw member having a clamping surface in registry with said projection means whereby a tube sleeved over said projection means is adapted to be clamped and compressed between said projection means and said clamping surface by closing pivotal movement of said handles and jaw members to thereby form a dimple on the inner surface of said tube and a corresponding nipple on the outer surface of said tube; and gauge means carried on said second jaw member for measuring and indicating the height of a nipple formed on said tube by said projection means.

6. A tool as described in claim 5, wherein said gauge means comprises an elongate contact pin mounted for axial movement on said second jaw member, said contact pin having one end thereof adapted to engage the outer surface of a tube when in sleeved position over said projection means whereby the forming of a nipple on said tube by said projection means produces axial movement of said contact pin corresponding to the height of the nipple, and dial indicating means responsive to axial movement of the contact pin for indicating the height of the nipple.

References Cited
UNITED STATES PATENTS

| | | | |
|---|---|---|---|
| 1,513,641 | 10/1924 | Simmons | 72—34 |
| 2,645,142 | 7/1953 | Schwenzfeier | 72—409 |
| 2,828,780 | 4/1958 | Gray | 72—409 |
| 2,890,611 | 6/1959 | McPherson | 72—34 |
| 3,146,804 | 9/1964 | Wallshein | 140—106 |

CHARLES W. LANHAM, *Primary Examiner.*

R. D. GREFE, *Assistant Examiner.*